Figure 3:
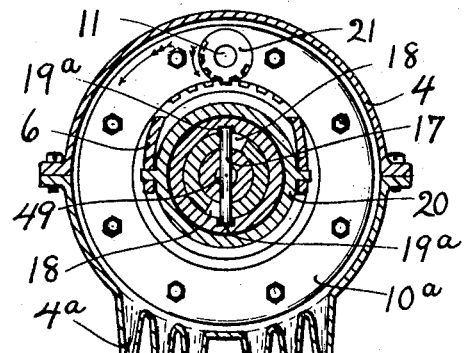

Oct. 23, 1934.  L. SWENINGSON  1,977,866

VARIABLE SPEED TRANSMISSION

Filed Dec. 20, 1930  2 Sheets-Sheet 1

INVENTOR
Louis Sweningson
BY John A. Bommhardt
ATTORNEY

Oct. 23, 1934.  L. SWENINGSON  1,977,866
VARIABLE SPEED TRANSMISSION
Filed Dec. 20, 1930  2 Sheets-Sheet 2
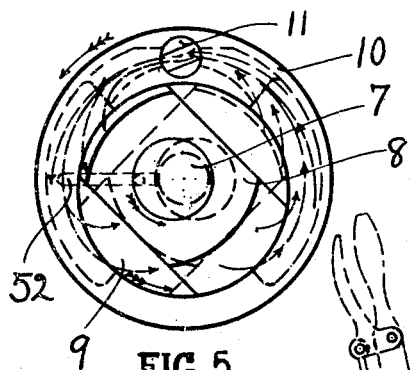
FIG. 5
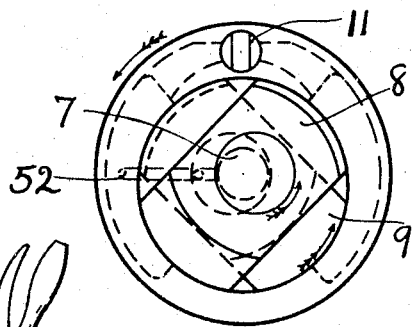
FIG. 6
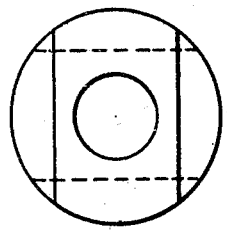
FIG. 9
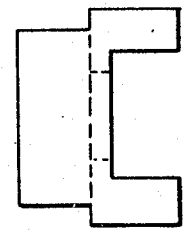
FIG. 10
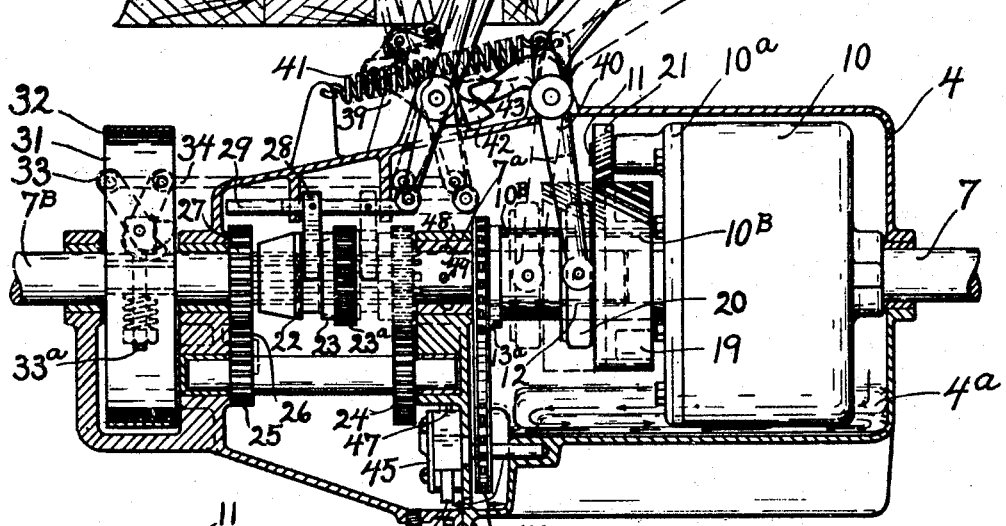
FIG. 8
FIG. 7
INVENTOR
Louis Sweningson
BY
John A. Bommhardt
ATTORNEY Patented Oct. 23, 1934

1,977,866

UNITED STATES PATENT OFFICE 1,977,866

VARIABLE SPEED TRANSMISSION

Louis Sweningson, Cleveland, Ohio

Application December 20, 1930, Serial No. 503,716

9 Claims. (Cl. 192—58)

The invention described is a mechanical device generating fluid pressure which propels a part delivering power at variable speed relative to the fluid pressure and having means controlling the fluid pressure and thereby controlling the speed of the driven power through means by which the power is transmitted.

The object of the invention is to provide a compact and dependable mechanism through which may be had full range of speed change from no revolutions up to that of the motive power to which it may be attached. A further object is to permit a full range of speed change through a device in operation and under load without disengaging said load from the motive power. A still further object is to provide a simple single lever control, the forward and reverse movement of the lever governing the increase or decrease in speed. Other objects and purposes relate to silent operation elimination of power transmission through gears and consequent power loss, means of maintaining a desired speed delivery with intermittent or variable loads, means of circulating and cooling the fluid content if necessary under severe working conditions, foot lever speed control in combination with a brake drum, brake lever and reversing gear comprising an adaption especially for vehicles.

It will be observed that power may be delivered through the device at any desired speed in the direction of rotation of the power supply without said power being transmitted through gears. Reversing gears are shown changing the direction of rotation of the driven shaft for use in connection with nonreversing power units such as an internal combustion engine though in connection with a reversing power unit the device is adaptable to be effective in either direction.

The conventional clutch usually required between the power unit and other speed changing apparatus is also eliminated. The part of the device shown in direct connection with the power unit is able to rotate freely within a cylinder until the circulation of the fluid therein is restricted, thereby imparting turning movement to the driven shaft as a result of said restriction of fluid movement. A full stoppage of the fluid circulation within the cylinder will result in direct or full speed delivery equal to that of the motive power to which it may be connected.

Improvement relative to simplicity and convenience of control of speed variation is apparent. The conventional hand lever for control of speed variation thru gears, in the operation of vehicles, is also eliminated as shown and described, utilizing the conventional foot lever for speed control. The said foot lever controlling the speed would also have the effect of a clutch control in disengaging the power when fully compressed, gradually increasing the speed of power transmission as it is released. Movement of the brake lever to an effective position will move and hold the transmission control lever in an inoperative position. By this method of machine or vehicle control the operator has the free use of both hands for steering or other operation. Though anticipating the use of the conventional foot brake lever operating parallel with the speed control or what may be termed a fluid clutch lever, the operation and control of a machine or vehicle is greatly simplified, and a hand operated gear shift lever has been eliminated which heretofore has required much operating of a clutch in disengaging the motive power to permit limited or step speed changes through gears.

Greater flexibility of power is to be had through the device described especially in connection with internal combustion engines. The effect of restricted fluid circulation resulting in variable speeds also has the advantageous effect of a resilient connection with the source of power avoiding jolts and jerks in applying the power to the load. Much undue strain in the motive power unit is also avoided especially in vehicular operation as it is common practice to neglect using lower starting speeds through gears to avoid much manual operation of the clutch and gear shift lever thereby causing undue wear and strain in motor and clutch parts as well as fuel waste.

The variable speed transmitter as described, embodying a fluid clutch and distinctive feature of speed control under load through a single lever, is equally important and useful for various industrial purposes, machine tools, etc., eliminating step pulleys, belts, belt shifting apparatus and gears.

Moving parts submerged in oil within the cylinder have broad bearing areas relative to each other, such that the lubricant oil forms a sufficient seal therebetween. It is important relative to effective operation that the space within the cylinder be kept full of the said lubricant oil. Ordinarily shaft journals within the cylinder head hubs, valve stem and cylinder head joint would require careful packing to guard against loss of the oil content, which is a hazard as to reliable operation over a long period. Possible increase in temperature of the oil to a point that would necessitate cooling as a result of severe or adverse working conditions, is also a condition to be met relative to reliable operation, and convenience of renewal of the lubricant oil used for hydraulic effect is a desirable feature. Therefore features constituting improvement will be described which contribute to simplicity of structure, reliability of operation permitting of considerable wear, elimination of usual fibrous packing requirements, etc. A fluid pump with novel means of injecting, circulating and cooling the lubricant oil within the revolving cylinder, is an important part of the variable speed transmitting device. It will be appreciated that the fluid flow from said pump through the cylinder insures a fullness of fluid content at all times to the extent of eliminating usual packing requirements at joints as such leakage as may occur therethrough would be of no consequence.

The device, properly termed, a variable speed transmitter, is capable of functioning as a clutch and may be used as such in connection with certain industrial equipment or it may be adapted for delivery of a fixed speed omitting the hand lever for full range control. Though the structure may be altered and effects limited relative to requirements it still constitutes a variable speed transmitter if only in starting in that the engagement of the power driven part and the propelled part is by hydraulic means resulting in more or less gradual starting of the load, increasing of the speed to a fixed limit or to full speed of the motive power. It is also apparent that the number of pistons may be varied without departing from the spirit of the invention.

Figure 4:
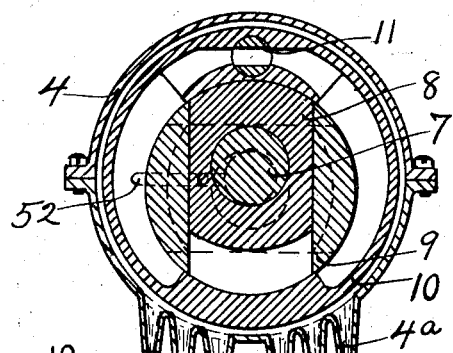
Figure 2:
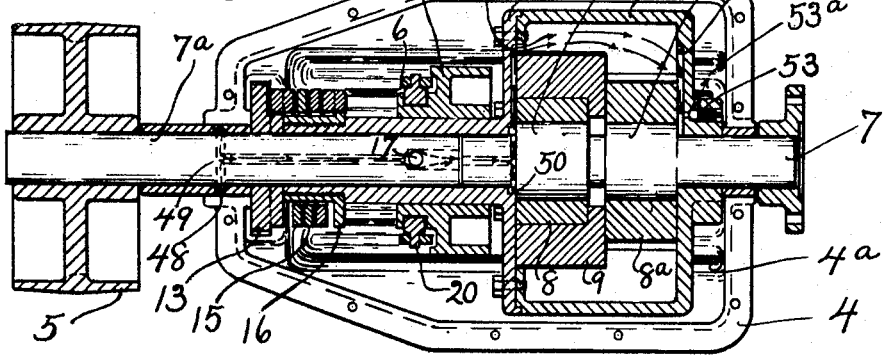
Figure 1:
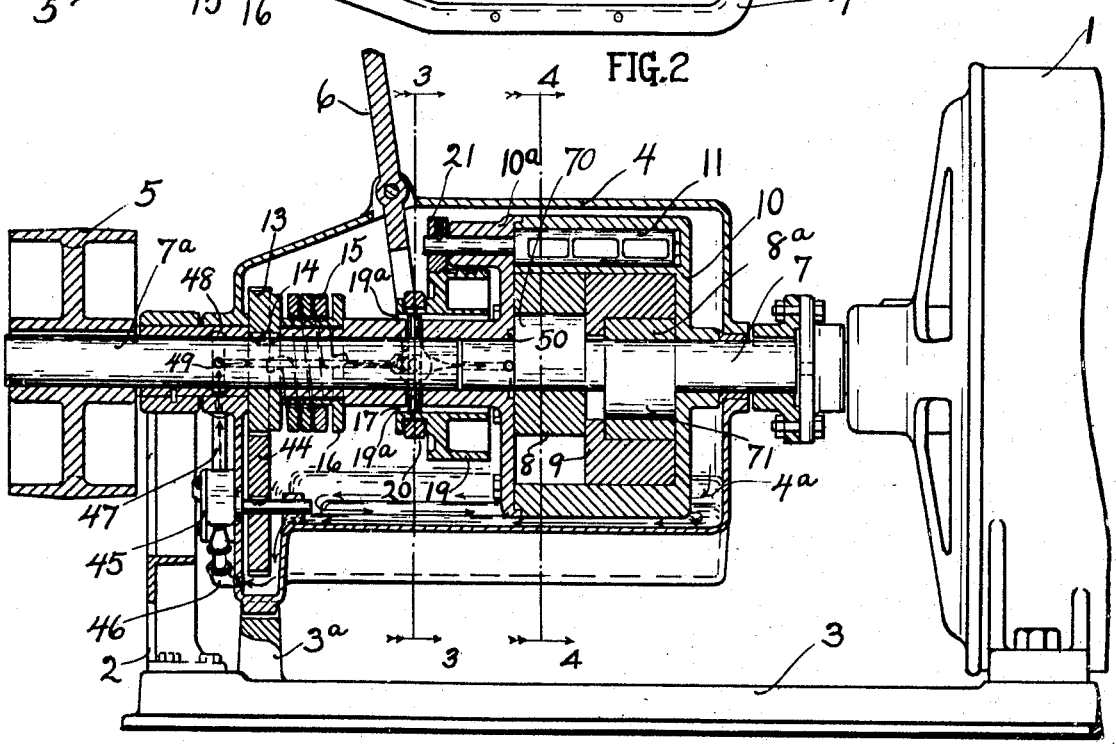

In the accompanying drawings:

Fig. 1 is a vertical longitudinal section of the transmission. Fig. 2 is a horizontal longitudinal section. Fig. 3 is a section on the line 3—3 of Fig. 1. Fig. 4 is a section on the line 4—4 of Fig. 1. Figs. 5, 6 and 7 are diagrams representing the parts in different positions. Fig. 8 is a side elevation of a variable speed transmitter with its stationary casing in section, showing a combination including reversing gears for changing the direction of rotation of the driven shaft, a brake drum and control levers, comprising a unit especially for vehicle operation and control. Figs. 9 and 10 are front and side elevations of the rotor.

In Fig. 1 is shown a motor 1 and a bearing bracket 2 mounted upon a base 3, the variable speed transmitter being supported therebetween, its stationary casing 4 being prevented from turning by a lug projecting within a slot of post 3a integral with the base. The power of the motor is delivered through the device to the pulley 5 which may be governed as to speed by the control lever 6.

In Figs. 1 and 2 is shown a shaft 7 having eccentrics 70 and 71 diametrically opposite to each other. Pistons 8 and 8a are in operative connection with said eccentrics and form double acting pistons operating at right angles to each other within ways at each end of a cylindrical rotor 9 which is in an eccentric position relative to shaft 7, and rotated in the same direction though at one half shaft speed by the movement of the pistons. An analysis of the position of shaft 7 with eccentrics 70 and 71, pistons 8 and 8a and rotor 9, as shown in Figs. 6, 7, 8 and 9, will show clearly that rotor 9 is rotated at one half speed of shaft 7 by the piston movement. It will be observed that rotor 9 is off center relative to the shaft 7 therefore rotation of the shaft 7 causes the pistons, carried by eccentrics 70 and 71 of said shaft, to slide within the ways of the rotor 9 as turning movement is imparted to said rotor by the shaft and piston movement. Figs. 6, 7, 8 and 9 show the shaft, pistons and rotor in relative positions for each quarter turn of the shaft 7. The rotor, shaft and pistons are enclosed within a cylinder 10 in contact with circular parts of said rotor on opposite sides. The area between said rotor, pistons and cylinder is filled with fluid preferably a lubricant oil. A plug valve 11 (see Figs. 1, 4 and 5) is in a position to obstruct the circulation of fluid from one side of the rotor to the other (as indicated by arrows in Fig. 5) as the shaft, pistons and rotor are rotated through connection with the motive force. It will be apparent therefore that the shaft, pistons and rotor may move freely within the cylinder when valve 11 is fully open, the fluid displaced by pistons on one side, passing through valve 11 and filling space equal to that of piston displacement.

Therefore in restricting the fluid flow through valve 11 a resistance is set up with a tendency to turn cylinder 10 in the same direction as that of shaft 7, and said turning tendency of cylinder 10 is increased or decreased by increasing or decreasing the fluid passage through valve 11. When said valve is fully closed, piston and rotor movement within the cylinder is prevented through inability of the fluid to circulate, therefore the said parts with shaft 7 will rotate as one, resulting in full speed transmission equal to that of the speed of the shaft. The variable turning movement thus applied to cylinder 10 is imparted to shaft 7a through cylinder head 10a, said parts being connected by a resilient connection as shown in Figs. 1 and 2 and now to be described.

A gear or collar 13 is fixed to shaft 7a by a key 14. A torsional spring 15 is in operative connection with gear or collar 13 and flange of sleeve 16 by hook ends engaging said parts as shown in Figs. 1 and 2, sleeve 16 being fixed to the hub of cylinder head 10a and said cylinder head being fixed to cylinder 10 by a series of cap screws. Extending through shaft 7a and within the cylinder head hub, is a pin 17 having a limited turning movement within the hub in slots 18, shown in Fig. 3. Thus as the load is applied to shaft 7a through pulley 5 there will be some contraction of spring 15 according to the amount of load applied resulting in some turning movement of shaft 7a and pin 17 within the cylinder head hub. Full or excess load will result in a movement of said pin to the extremity of slots 18, preventing further turning or resilient movement. The ends of pin 17 extending through slots 18 are in operative connection with a collar 19 by slots 19a therein, thus the resilient turning movement of shaft 7a within the cylinder head hub is also applied to the collar 19 which is also capable of being moved endwise upon the hub by operation of control lever 6 which is in operative connection with said collar through ring 20 hinged to the fork of said lever and within a circular groove in the collar. Within the circular rim of collar 19 are several spiral gear teeth in operative connection with the teeth of a gear 21 fixed to the stem of valve 11. (See Figs. 1, 3, and 8). It will be apparent that forward or reverse movement imparted to collar 19 by lever 6 will impart a turning movement, to valve 11, thus increasing or decreasing the fluid passage through valve 11 resulting in more or less speed of transmission according to the position of valve 11. The valve movement described relative to lever 6 is operative and effective with the transmitter in operation and under full or partial load.

The resilient turning movement described also imparts an additional speed regulating effect relative to intermittent or varying loads. Whereas the fluid valve 11 may be positioned through lever 6 for a fixed speed delivery with a constant load, intermittent or variable loads would result in some variation in the speed of transmission due to variable fluid pressure and velocity through valve 11, therefore the turning movement of shaft 7a and pin 17 which varies according to the load imposed will impart a turning movement to collar 19 and valve 11 thus regulating the area of the fluid passage and speed of the transmitter in accord with variable or intermittent loads imposed, maintaining a near constant speed delivery.

In Figs. 1 to 5 inclusive, describing the dual means regulating the speed of power transmission, the movement of valve 11 is clockwise to open the fluid passage. When the transmitting device is used in connection with a machine tool or for other industrial purposes the desired speed of power transmission relative to load at the time, may be secured and fixed in positioning lever 6. However, the load may be suddenly diminished resulting in decreased fluid pressure within the cylinder on the side of the rotor where the fluid displacement occurs. Then the diminished pressure would be unable to maintain the same fluid velocity through the valve opening as positioned by the hand lever for the greater load. Therefore were it not for the automatic control the speed of the transmission would increase somewhat. To avoid continual manipulation of the hand lever to maintain constant speed with varying or intermittent loads the automatic control will increase or decrease the valve opening relative to load and the fluid pressure thereby maintaining nearly constant speed of transmission.

The transmission unit with controls as shown in Fig. 8 intended mainly for vehicle operation and control in conjunction with internal combustion engines, does not require the automatic speed controlling feature for variable or intermittent loads as the speed of the motive power is conveniently increased or decreased compensating for such variations as occur, therefore the shaft 7a is keyed permanently to the cylinder head hub by a key 12.

As shown in Fig. 8, shaft 7a has a splined end abutting the splined end of shaft 7B at 22. A slidable coupling 23 is capable of connecting or disconnecting said shafts. When the said coupling is in a forward position as shown in full lines in Fig. 8, shafts 7a and 7b are joined as one transmitting the power in a direct manner without passage through gears. When moved to its opposite position as shown in dotted lines it becomes disengaged from shaft 7b and gear 23a integral with said coupling, will engage gear 24 which is integral with the same shaft support as is gear 25 thereby delivering the motive power to and through an intermediate gear 26 to gear 27 which is integral with shaft 7b causing said shaft to rotate in an opposite direction providing means for reversing the movement of a vehicle or other machinery. Said reversed rotation is subject to the variable speed effects of the transmitter as herein described. A fork 28 fixed to a guide rod 29 in operative connection with coupling 23 and a hand lever 30 comprises a means of reversing the direction of rotation of the power delivery.

Brake drum 31, integral with shaft 7b is surrounded by a brake band 32. The usual eccentric head lever 33 is hinged to a stud 33a which extends through the brake band ends, a rod 34 connects lever 33 and hand lever 35 constituting means of retarding or preventing the rotation of shaft 7b which is the propelling end of the variable speed transmitting device as shown in Fig. 8.

An auxiliary lever 36, rod 37 and pawl 38 which engages teeth of a stationary part 39 constitutes usual means of locking the brake lever 35 in an effective position.

A speed control lever 40 of conventional form for foot operation is in operative connection with collar 19 through ring 20 and capable of moving said collar endwise upon the hub of cylinder head 10a and over a key 10b engaging said hub and collar, imparting a turning movement to gear 21 and valve 11 through spiral teeth as has been described relative to Figs. 1 and 2.

Reverse gear lever 30 and brake lever 35 are in inoperative positions as shown in full lines (Fig. 8). Speed control lever 40 is held in a forward position, as shown in full lines, by a tension spring 41. Valve 11 would therefore be in a closed position as in Fig. 6 and shafts 7, 7a and 7b with parts supported thereon will rotate as integral. The motive power applied to shaft 7 will be delivered through shaft 7b at full speed. Partial depression of the foot control lever 40 will impart an anticlockwise movement to valve 11 and cause a partial opening of the fluid passage as shown in Fig. 7, resulting in diminished speed of cylinder 10 and shafts 7a and 7b, in connection therewith. A full depression of lever 40 and resultant movement of collar 19 to the position shown in dotted lines, will move valve 11 to a full open position as shown in Figs. 1 and 4. The restriction to the fluid flow thus relieved will permit free movement of shaft 7 with pistons and rotor within the cylinder, having the effect of a clutch in disengaging the motive power from the load. In gradually permitting lever 40 to return to its forward position through tension of spring 41, the speed of transmission will likewise gradually increase up to that of the motive power. Movement of brake lever 35 to an effective position as shown in dotted lines will move and hold the control lever 40 in a depressed position thus rendering the transmitting device inoperative when the brake is applied. Integral with brake lever 35 is an ear 42 which contacts with a projection 43 integral with the control lever 40 comprising means of accomplishing said movement and purpose.

In Figs. 1 and 8 is shown a small rotary fluid pump 45 in operative connection with shaft 7a through gears 13 and 44 relative to Fig. 1 and by chain and sprockets 13a and 44a as shown in Fig. 8. Said fluid pump has an intake opening 46 adjacent to the bottom of casing 4 and a discharge passage 47 leading to an annular groove 48 in the shaft bearing. A central passage 49 is at all times in communication with said annular groove 48 and annular pocket 50 as shown in Figs. 1 and 2. A groove 51 in the inner face of cylinder head 10a, leads from said circular pocket 50 to the space or pocket beyond the periphery of rotor 9 on the side which is at all times an intake passage relative to fluid displacement of the rotor and pistons as described and indicated by arrows in Fig. 5. A groove 52 in the opposite cylinder head leads from said intake pocket to a check valve 53 adjacent to the axis of the transmitter. See Fig. 2. Said check valve composed of a ball and spring will permit a fluid discharge through hole 53a relative to internal fluid pressure as imposed by pump.

By "intake pocket" is meant the pocket or space exposed to the receding pistons and therefore cannot be affected by the working pressure built up on the opposite side for advancing the pistons. A study of the diagrams Figs. 5, 6 and 7 will show that the connection provided by the channel 52, in the anti-clockwise rotation indicated, is on the "following" side of the pistons and not the "power" side.

A stationary casing 4 encloses and collects oil discharged from said cylinder. The bottom section of said casing has channels 4a through which the oil flows to the pump, providing sufficient exposure for cooling. See Figs. 1, 2, 3, 4, 8. It will be observed that channels grouped on each side of the center are somewhat one above the other. The outer channels will collect most of the fluid oil discharged which will flow to the pump in a zigzag manner through said group of channels forming a continuous passage, increasing the time of exposure resulting in effective cooling of the oil as indicated by arrows in Fig. 8.

I claim:

1. In a fluid transmission, the combination of a housing, a driving shaft projecting into the same, a rotary cylinder in the housing, a rotor in the cylinder, having radial ways, pistons working in said ways, eccentrics on said shaft, operating against said pistons, to circulate fluid in the cylinder, a valve controlling the circulation, and a driven shaft operatively connected to the cylinder.

2. The combination stated in claim 1, the connection between the cylinder and the driven shaft being resilient, and means automatically operated by said resilient connection to control the opening of the valve.

3. In a fluid transmission, the combination of a housing, driving and driven shafts projecting into said housing, variable fluid pressure actuated means in said housing, between said shafts, to transmit motion from the former to the latter, said means including a rotary cylinder and a rotor therein and spaced therefrom, and a pump driven by the driven shaft and having an inlet from the housing and an outlet to said space to supply fluid thereto.

4. The combination stated in claim 3, the housing having means to cool the fluid therein.

5. The combination stated in claim 3, the housing having spaced channels in the lower part thereof to cool the fluid therein.

6. The combination stated in claim 3, the said means having fluid passages permitting the escape of fluid therefrom into the housing, and also having supply passages in the shafts connecting the discharge of the pump to said means.

7. The combination with a casing, and driving and driven shafts therein, of a fluid transmission between the shafts, including a rotary cylinder, a valve controlling the fluid flow in said transmission, a manually operated lever to operate the valve and vary the speed transmitted, and means automatically actuated by varying loads on the driven shaft to control the valve operation and speed, said means including gears operatively connected to the valve, a resilient connection between the driven shaft and the cylinder and an operative connection between said shaft and said gears, said fluid transmission being enclosed within the casing and forming a self-contained unitary structure.

8. The combination stated in claim 7, said means also including a gear collar concentric with the shafts and operatively connected to the valve, and the resilient connection comprising a spring coiled around the driven shaft and connected at one end to the collar and at the other end to the said cylinder.

9. The combination stated in claim 7, said means also including helical gears one of which is shiftable axially concentric to the shafts, the lever being operatively connected to said gear to shift the same, and the resilient connection comprising a coiled spring attached between the driven shaft and said cylinder.

LOUIS SWENINGSON.